(No Model.)
R. PERKINS.
COMBINATION PEDAL FOR CYCLES.
No. 533,180. Patented Jan. 29, 1895.
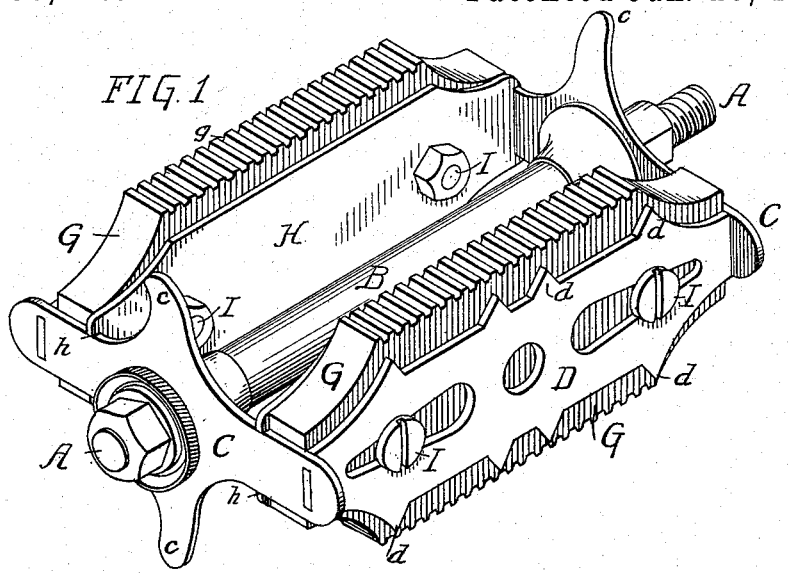
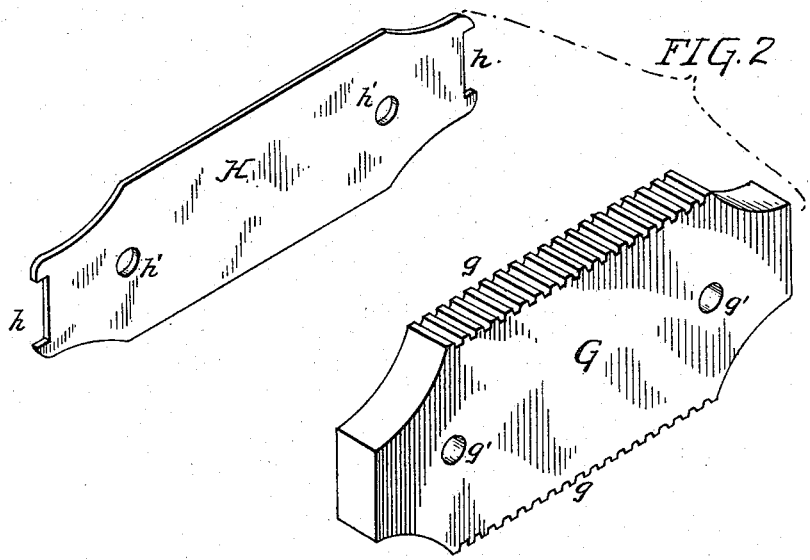
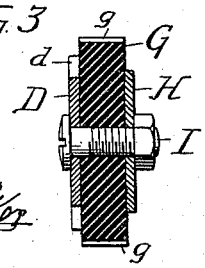
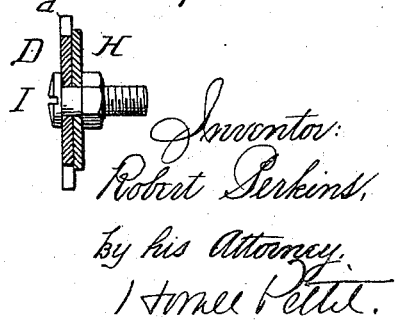

UNITED STATES PATENT OFFICE.

ROBERT PERKINS, OF ROCKAWAY, NEW JERSEY.

COMBINATION-PEDAL FOR CYCLES.

SPECIFICATION forming part of Letters Patent No. 533,180, dated January 29, 1895.

Application filed October 14, 1893. Serial No. 488,150. (No model.)

*To all whom it may concern:*

Be it known that I, ROBERT PERKINS, a subject of the Queen of Great Britain and Ireland, and a resident of Rockaway, State of New Jersey, have invented a certain new and useful Improved Combination-Pedal for Cycles, of which the following is a full, clear, and exact description, reference being had to the accompanying drawings, forming part of this specification.

The object of my invention is to provide an improved form of cycle pedal of such character that it may be used either as a "rat trap" pedal for racing purposes, or may be provided with rubber tread blocks, as more fully set forth hereinafter.

In the accompanying drawings:—Figure 1 is a perspective view of my improved pedal showing the same when adjusted for use with rubber treads. Fig. 2 is a perspective view illustrating one of the rubber treads, and its clamping plate detached from each other. Fig. 3 is a cross section through one side of the pedal showing the rubber tread clamped in position, and Fig. 4 is a similar view without the tread block.

The pedals ordinarily employed for bicycles are provided with rubber tread blocks, while those used principally for racing purposes are what are known as "rat trap" pedals, the latter comprising essentially plates secured in the opposite end frames on each side of the central spindle of the pedal, and having toothed edges forming spurs which are adapted to engage in recesses in the sole of the rider's shoe or are so sharp as to be impressed therein and obviate any risk or danger of slipping of the foot when traveling at a high rate of speed.

The pedal which I propose to construct is of such a nature that its character may be easily converted from a "rat trap" to a pedal provided with rubber treads or vice versa.

Referring to the drawings, A, represents a central spindle adapted to be secured to one of the propelling cranks of the cycle. Mounted on this spindle in any suitable manner is a sleeve, B, having at its opposite ends suitably shaped plates, C, which form the framework of the pedal and are provided with the usual guards or guides, c, for engagement with the opposite sides of the sole of the shoe. Secured between these frames, C, are plates, D, provided with spurs or teeth, d, of the ordinary "rat trap" construction, the pedal so far described being of any suitable or ordinary character now on the market.

G, G, represent blocks of rubber, preferably having corrugated or serrated wearing faces, g, and provided with openings, g', for the passage of securing bolts, I. These blocks are fitted against the inner faces of the rat trap plates, D, when a rubber tread is to be employed and are held up in position against the plates, D, by clamping plates, H, having opposite recessed ends, h, adapted to fit over the frames, C, and provided with openings, h', through which the securing bolts, I, may pass. The securing bolts, I, are passed through the openings g', and h' and through the openings usually made in the plates, D, of the rat trap pedal for ornamental purposes (as in Fig. 1) although if such openings are not already in the plates suitable openings may readily be drilled for the passage of the bolts.

The rubber blocks are much deeper or wider than the plates, D, and when in position will, as shown in Figs. 1 and 3, prevent the shoe from coming in contact with the spurs, d, and enabling the rider to use a rubber tread without the employment of expensive fittings or the necessity of substituting entirely different pedals. The clamping plate, H, may be removable from the frames, C, if desired, so that after the rubber block is removed the clamping plate may also be taken off, but, if desired, where the additional weight is not material the clamping plate may be screwed up against the rat trap plate, D, and held in position by means of the bolts, I. These rubber blocks and the clamping plates and bolts may be made and sold in sets, independently of the pedal and may be readily applied to any ordinary rat trap pedals without difficulty.

I am aware that rat-trap pedals have heretofore been invented in combination with rubber tread blocks. This combination I do not claim broadly. The object of my invention is, as heretofore stated, to provide an improved pedal either for racing purposes or for ordinary road purposes. My invention, as herein described, provides a construction wherein either only the one form or the other may be employed without adjustment. The rat-trap construction can only be employed when the rubber tread blocks are removed, and at no time can the rubber blocks come into operation while the rat-trap is being used. In constructions heretofore invented wherein by a given amount of extra pressure upon the rubber blocks the rat-trap will come automatically into operation numerous objections present themselves, as the rat-trap necessarily from the construction frequently comes into operation when it is not desired, as for instance where extra pressure is exerted in mounting heavy grades, or in passing over rough roads. My invention presents a combined form wherein by proper adjustment either the one form or the other may be employed, but not both at practically the same time.

Having thus described my invention, what I claim, and desire to secure by Letters Patent, is—

The combination with a rat trap pedal, of a rubber tread block of a width greater than that of the rat trap plates, a clamping plate, H, having recessed ends, $h$, adapted to fit over the end frames of the pedal, and securing bolts, as I, for securing the plates together, substantially as specified.

In witness whereof I have hereunto set my hand this 9th day of October, A. D. 1893.

ROBERT PERKINS.

Witnesses:
W. CRAWFORD,
E. S. ARNOLD.